US009672656B1

(12) United States Patent
McPhail (10) Patent No.: US 9,672,656 B1
(45) Date of Patent: Jun. 6, 2017

(54) VARIABLE LEVEL-OF-DETAIL MAP RENDERING

(71) Applicant: GOOGLE INC., Mountain View, CA (US)

(72) Inventor: Travis McPhail, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/971,801

(22) Filed: Dec. 16, 2015

(51) Int. Cl.
| G06T 17/05 | (2011.01) |
| G06T 15/20 | (2011.01) |
| G06T 15/04 | (2011.01) |
| G06T 15/80 | (2011.01) |
| G06T 17/20 | (2006.01) |
| G06T 19/20 | (2011.01) |

(52) U.S. Cl.
CPC .............. *G06T 15/20* (2013.01); *G06T 15/04* (2013.01); *G06T 15/80* (2013.01); *G06T 17/20* (2013.01); *G06T 19/20* (2013.01); *G06T 17/05* (2013.01); *G06T 2210/36* (2013.01); *G06T 2215/16* (2013.01); *G06T 2219/2024* (2013.01)

(58) Field of Classification Search
None
See application file for complete search history.

(56) References Cited

U.S. PATENT DOCUMENTS

| 6,191,793 B1 * | 2/2001 | Piazza ..................... G06T 15/04 345/582 |
| 8,274,524 B1 * | 9/2012 | Cornell ................ G08G 1/0969 345/428 |
| 8,416,242 B1 * | 4/2013 | Hutchins ................. G06T 15/00 345/428 |
| 9,495,767 B2 * | 11/2016 | Rosasco ................ G06T 11/001 |
| 9,542,724 B1 * | 1/2017 | Rosasco .................. G06T 15/04 |
| 2004/0233219 A1 * | 11/2004 | Aguera y Arcas ... G06F 3/0481 345/606 |
| 2005/0206657 A1 * | 9/2005 | Arcas ..................... G01C 21/36 345/660 |
| 2007/0165035 A1 * | 7/2007 | Duluk ....................... G06T 1/60 345/506 |
| 2012/0038657 A1 * | 2/2012 | Grossman ............... G06T 15/04 345/585 |
| 2012/0050285 A1 * | 3/2012 | Kannenberg ........... G01C 21/32 345/419 |
| 2013/0321399 A1 * | 12/2013 | Rohlf ...................... G06T 17/05 345/419 |
| 2013/0321443 A1 * | 12/2013 | Pahwa .................... G06T 15/04 345/587 |

* cited by examiner

*Primary Examiner* — Ryan D McCulley
(74) *Attorney, Agent, or Firm* — Marshall, Gerstein & Borun LLP (57) ABSTRACT

To render features on a digital map, a position and orientation of a virtual camera relative to a plane of the digital map is determined. The plane is tilted so that a plane of a viewport of the digital map is not parallel to the plane of the digital map, where the viewport delimiting a view of the digital map. Map features are selected for inclusion in the view of the digital map in accordance with the determined position and orientation of the virtual camera. A level-of-detail (LOD) is determined for each of the map features in accordance with a distance between the virtual camera and the map feature. The map features are rendered, using a rendering engine, in accordance with the determined LODs.

20 Claims, 5 Drawing Sheets

VARIABLE LEVEL-OF-DETAIL MAP RENDERING

FIELD OF THE DISCLOSURE

The present disclosure relates to interactive digital maps and, more particularly, to efficiently and accurately rendering features on a digital map displayed on a tilted plane.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Interactive digital maps, which various geographic applications display on computing devices, generally depict numerous geographic features, such as roads, outlines of countries and towns, bodies of water, buildings, etc. Geographic features displayed as part of a digital map can have different appearance at different levels of magnification of the digital map. In general, new details in feature geometry, as well as more subtle variations in color, emerge when the virtual camera approaches a certain area. Moreover, some of geographic features can be depicted differently in different contexts. For example, a road normally depicted as a blue line can be rendered in red to illustrate heavy traffic, or the boundary of a county can be highlighted in response to a geographic query.

In addition to providing top-down views of digital maps, some geographic applications tilt the map plane in some situations to make the upper portion of the map appear farther away from the virtual camera than the lower portion of the digital map. Generating such views seamlessly, where the individually features are rendered consistently with the tilt, presents numerous technical difficulties. It is particularly difficult to generate such views efficiently.

SUMMARY

A geographic application of this disclosure renders features of a digital map ("map features") in accordance with level-of-detail (LOD) values determined based on distances between the virtual camera and vertices that make up the geometry of the features. When the geographic application displays the digital map on a tilted plane, so that different map features appear to be at different distances from the virtual camera, the LODs of various vertices visible within the map viewport thus define a certain range of values rather than a single value. The geographic application then uses the LOD values to select style parameters for the map features, such as line color, fill color, line width, etc. As a result, presentation of map features gradually varies with distance. Moreover, the geographic application presents smooth, seamless transitions between discrete portions of the digital map, e.g., map tiles.

To make rendering efficient, the geographic application encodes style information into uniform arrays which persistently store information in the memory of a graphics card through multiple executions of vertex and fragment shaders, or programs that commonly make up the rendering pipeline on a graphics card. The geographic application also calculates LOD values for the corners of map tiles based on the distances between the corners and the virtual camera (or the plane of a virtual camera, depending on the type of the digital map), so that a vertex shader during execution can interpolate between the corner values to determine per-vertex LODs. The vertex shader then can look up style parameters and, when necessary, interpolate the style parameters to determine how the map features are rendered.

One particular embodiment of these techniques is a method of rendering features of digital maps. The method includes selecting, using one or more processors, a map tile corresponding to a certain geographic area and a certain zoom level, such that the map tile contains descriptions of geometries for map features. The method also includes determining, using the one or more processors, a distance between a virtual camera and each corner of the map tile, where at least two of the resulting distances are different, and determining, for each of the corners using the one or more processors, a corner level-of-detail (LOD) based on the corresponding distance from the virtual camera. The method further includes providing (i) the indications of geometries for the plurality of map features and (ii) the determined corner LODs to a rendering engine for rendering each of the plurality of map features using LODs interpolated between the corner LODs, as part of generating a view of a digital map.

Another embodiment of these techniques is a method of rendering features of digital maps. The method includes determining, using one or more processors, a position and orientation of a virtual camera relative to a plane of a digital map, where the plane is tilted so that a plane of a viewport of the digital map, delimiting a view of the digital map, is not parallel to the plane of the digital map. The method further includes selecting, using the one or more processors, map features to be included in the view in accordance with the determined position and orientation of the virtual camera, determining, using the one or more processors, a level-of-detail (LOD) for each of the map features in accordance with a distance between the virtual camera and the map feature, and rendering, using a rendering engine, the map features in accordance with the determined LODs.

Yet another embodiment of these techniques is a computing device comprising one or more general-purpose processors, a rendering engine including one or more graphics processors, a display device, and a non-transitory memory readable by the one or more general-purpose processors and storing instructions. When executed, the instructions cause the computing device to (i) select a map tile corresponding to a certain geographic area and a certain zoom level, the map tile containing descriptions of geometries for map features, (ii) determine a distance between a virtual camera and each corner of the map tile, where at least two of the resulting distances are different, (iii) determine, for each of the corners, a corner level-of-detail (LOD) based on the corresponding distance from the virtual camera, and (iv) provide the indications of geometries for the map features and the determined corner LODs to the one or more graphics processors, where the one or more graphics processors render each of the map features using LODs interpolated between the corner LODs to generate a view of a digital map for display via the display device.

DETAILED DESCRIPTION

Overview

A geographic application of this disclosure can display a digital map on a tilted mode, i.e., when the plane of the digital map ("the map plane") is not parallel to the plane of the user interface screen or, more generally, the plane of the map viewport. In these cases, the line-of-sight vector between a virtual camera, with a certain position and orientation in a three-dimensional space, is not perpendicular to the map plane, and thus distances between the virtual camera and various features of the digital map are not the same for a given tilted view of the digital map. As explained below with reference to FIG. 2, the distances relative to the features of the digital map can be calculated from the virtual camera as a point in 3D space or the plane of the virtual camera, depending on the type of projection of the digital map. For convenience, both types of distances are referred to in this document as "camera distance" or "distance to/from the virtual camera."

Rather than displaying all of the map features within the view at a same level of detail (LOD), the geographic application of this disclosure can determine LODs for various portions of the digital map based on the camera distance. The LOD generally corresponds to the complexity of representation of the map feature, in terms of feature geometry, color, etc. As discussed in more detail below, the geographic application can determine LODs on a per-vertex basis. The geographic application then can use the determined LODs to select and/or interpolate "styling" (or, simply, "style") parameters such as line color, line width, fill color, stroke type, and other visual properties that can be applied to geometry. In this manner, the mapping application generates seamless, smooth views of digital maps.

A map data server and/or the geographic application can partition map data into map tiles, each describing geometry of map features disposed within a certain geographic area and visible at a certain zoom level. Further, to make client-server communications as well as client-side rendering more efficient, the geometry is "de-coupled" from style information. Map features can be logically linked to the style information using style identifiers, for example.

In operation, the geographic application determines a set of map tiles that make up the view of the digital map on a tilted plane in accordance with the current position and orientation of the virtual camera. The set can include map tiles at different zoom level (e.g., map tiles displayed closer to the top of the screen appear to be farther away from the virtual camera, and can have lower level of magnification). The geographic application determines LOD values at the corners of each map tile based on the distance between the corner and the virtual camera. The geographic application then provides the corner LOD values along with the map tile and the style information to the graphics cards or, more generally, a rendering engine. The rendering engine then interpolates the corner LOD values to determine vertex-specific LOD values based on the locations of vertices relative to the corners. Using the vertex-specific LOD value, the rendering engine determines which style information applies to the vertex. To this end, the rendering engine can interpolate color, width, etc. for the proximate styles. The geographic application thus can generate mixed-LOD (or "heterogeneous") views of digital maps.

The geographic application can pass the style information to the rendering engine using a uniform array indexed by style identifiers. Vertices can be logically linked to the appropriate style information in the uniform array via style identifiers. The geographic application can subsequently update entries of the uniform array without also updating geometry (vertex) information provided to the graphics card. In this manner, shaders can efficiently restyle map geometry.

Example System and Organization of Map Data

Figure 1:
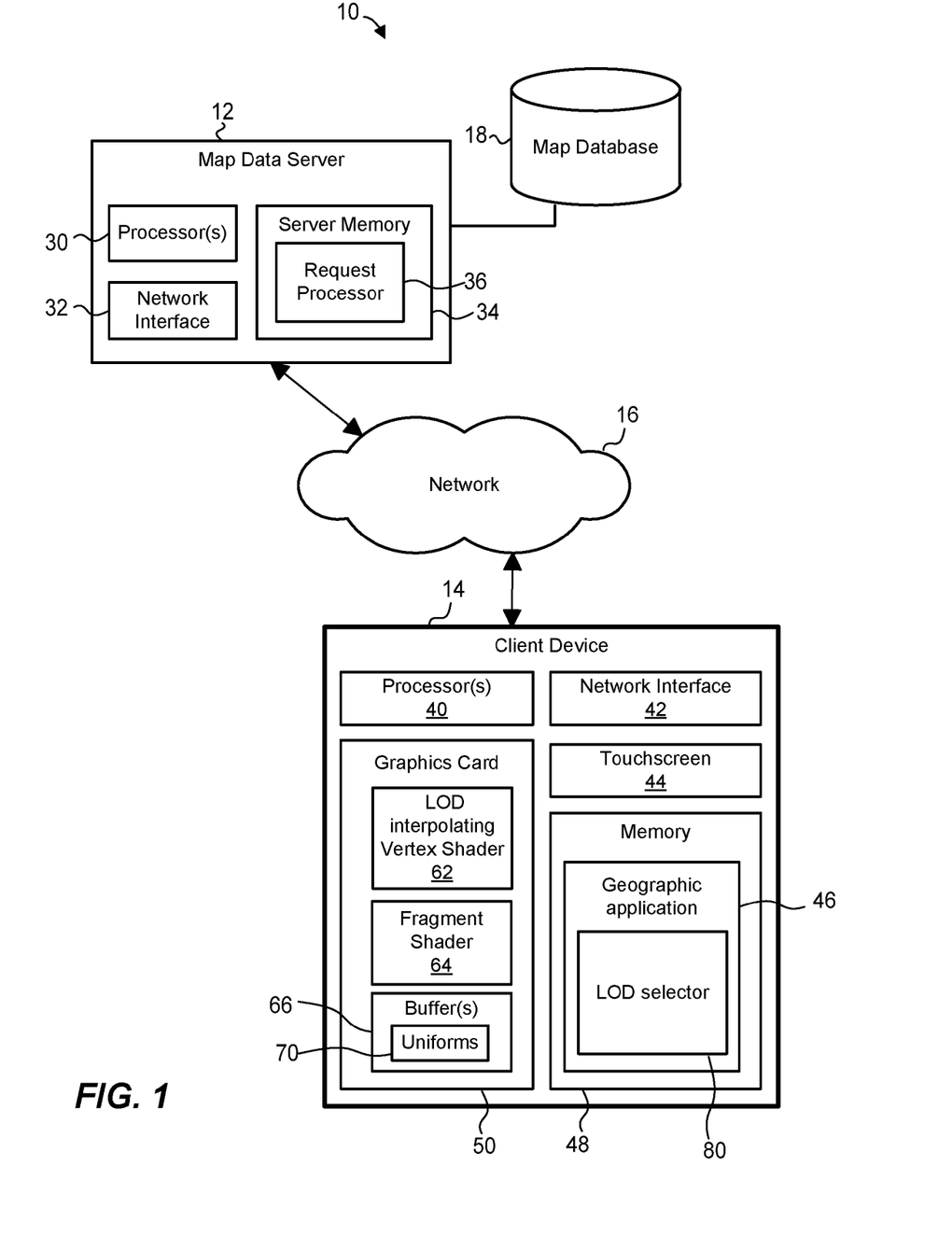
FIG. 1 is a block diagram of an example computing system in which techniques for rendering digital maps at multiple LODs can be implemented.

FIG. 1 is a block diagram of an example computing system 10 in which a map data server 12 provides map data to a client device 14 via a communication network 16 for rendering an interactive digital map. The map data server 12 is coupled to a map database 18 storing map data.

Map data can include descriptions of geometry for various map features such as buildings and other structures, roads, parks, bodies of water, etc. Besides roads designed for vehicles, the map data can describe bicycle paths, pedestrian paths, railway paths, shipping routes, airlines routes, etc. Map features can be defined in a vector graphics format, according to which images are described in terms of geometrical primitives based on mathematical expressions, or another suitable scalable format. Depending on the implementation, map features can be defined in two dimensions (2D) only, in three dimensions (3D) as wireframes to which raster textures are applied or geometric meshes, in "two-and-a-half" dimensions (2.5D) as 2D polygons "extruded" into the third dimension, etc. In some cases, map data also can include raster images in a bitmap format, for example. Further, map data also can include text label and various forms of metadata such as links to remote resources.

In some implementations, the system 10 separates the geometry of map features from style information that describes visual attributes of these map features. More particularly, whereas the geometry specifies how vertices of map features are positioned relative to each other and how these vertices are interconnected, style parameters specify colors of lines, fill colors for circles, triangles, polygons, and other closed shapes, widths of lines connecting the vertices, etc. Thus, a centerline can define the geometry of a road segment, and a geographic application can apply one width and one color to render the road segment as a local road with no traffic and another width and another color to render the same road segment as a highway with heavy traffic.

According to some of the implementations in which geometry is logically separated from styling, the map database 18 stores style parameters on a per-feature-type and per-zoom-level basis. For example, the map database 18 can store sets of parameters for rendering local roads at zoom level 9 as $S_{9-1}$, for rendering local roads at zoom level 10 as $S_{10-1}$, for rendering highways at zoom level 10 as $S_{10-2}$, for rendering building footprints at zoom level 12 as $S_{12-3}$, etc., with each set S specifying respective colors, widths, etc. Not every set S need to have the same elements, and some sets S can include parameters specific to features or zoom levels.

To efficiently associate styles with map features, the map data server 12 can assign style identifiers to sets of style parameters and assign appropriate style identifiers to various features at certain zoom levels. Thus, rather than storing multiple style parameters for map features, the map database 18 can store only style identifiers. For example, the map database 18 can store an indication that a segment an interstate highway at zoom level 11 should be rendered using style 234, a local road should be rendered at this zoom level using style 210, a bicycle path at this zoom level should be rendered using style 133, etc. The map data server 12 can use style identifiers to efficiently store as well as transmit map data to client devices such as the client device 14. In particular, the map data server 12 can transmit style information separately from map feature geometry, and even provide these two types of data to client devices at different times. As a more specific example, the map data server 12 can provide map feature geometry for a certain geographic area at one time, and subsequently instruct the client device 14 to "re-style" the digital map of the geographic area by providing new style information, linked to map features via style identifiers, without resending map feature geometry to the client device 14. Because map features include style identifiers, the client device 14 can quickly substitute new style parameters for old ones and efficiently re-render the digital map.

Further, the map data server 12 can organize and serve map data to client devices using map tiling. Map tiles generally correspond to 2D organization of geospatial data into a quadtree. Each tile at a given zoom level is divided into four tiles at the next level up to the highest level of magnification. Similarly, 3D organization of geospatial data can be implemented using octrees, in which a cubic volume contains map geometry at a certain zoom level and is subdivided into eight cubic volumes at the next zoom level, with each of the eight cubic volumes typically containing a more detailed map geometry. To map the surface of the Earth onto a plane for 2D representation, Mercator or another suitable projection can be used. Although the examples below refer to map data organized into 2D map tiles, the LOD and style parameter determination techniques of this disclosure can be extended to 3D map data organized into octrees.

According to some implementations, when the client device 14 requests map data for a certain geographic area to be displayed at zoom level Z, the map data server 12 provides style parameters, and possibly other map data, for the requested zoom level as well for the next zoom level Z+1. In this manner, the map server 12 allows the client device 14 to interpolate style parameters for other zoom levels, for which the corresponding map data may be unavailable at the client device 12. Such zoom levels can include intermediate zoom levels (e.g., a virtually unlimited number of intermediate zoom levels between discrete zoom levels Z and Z+1) as well as zoom levels below or above the {Z, Z+1} range. Further, the map data server 12 alternatively or additionally can provide some of the map data for the zoom level Z−1. Depending on the implementation, the map data server 12 can provide style parameters (e.g., stroke 1 width=0x05, stroke 1 color=0xFFFF000, stroke 2 width=0x04, stroke 2 color=0x8000FF00) for several styles and at several zoom levels at the same time as the map data or during a separate session for retrieving style parameters.

For example, the client device 14 may request map data for rendering a digital map of a geographic region R at zoom level 15, and the map data server 12 can provide the map data for zoom level 15 along with style information for zoom levels 15 and 17, for each road visible at zoom level 15 (or, alternatively, zoom levels 15 and 17). Using these style parameters, the client device 14 can scale representations of roads in the region R between zoom levels 15 and 17. More particularly, the client device 14 can use the techniques discussed in more detail below to interpolate style parameters and display a certain road segment at zoom level 16, 16.3, 15.55, etc.

With continued reference to FIG. 1, the map data server 12 can be implemented as a single device or as a group of devices. One or more of these devices can include one or more processors 30, a network interface 32, and a non-transitory computer-readable memory 34 that stores instructions executable on the one or more processors 30. For example, a request processor 36 can execute on the one or more processors 30 to receive requests from client device such as the client device 14, identify and retrieve map data including map feature geometry and style parameters from the map database 18, and transmit the map data to the requesting client device. Similarly, the map database 18 can be implemented in a single storage device or multiple storage devices. The communication network 16 can include any suitable number of Internet links, local area links, long-range wireless link, short-range wireless links, etc.

The client device 14 can be a portable device such as a smartphone or tablet computer, for example. More generally, the techniques for interpolating LODs and style parameters can be utilized both in portable and non-portable computing devices. The client device 14 includes a network interface 42 configured to communicate with other devices via the network 16 in a wired and/or wireless manner. The client device 14 also includes a touchscreen 44 configured to receive typed and gesture-based input and to display images generated by various applications executing on the client device 14, including a geographic application 46. In other implementations, the client device 14 can include an output-only display and receive input via a keyboard, a mouse, a microphone, sensors configured to detect 2D and/or 3D gestures, etc. Further, the client device 14 can include one or more general-purpose processors 40, a non-transitory computer-readable memory 48, and a graphics card 50 (e.g., including one or more graphics processing units, or GPUs) with buffer(s) 66. The graphics card 50 in the example implementation of FIG. 1 constitutes at least a part of the rendering engine of the client device 14. In other implementations, the client device 14 may include additional components or, conversely, not include some of the components illustrated in FIG. 1.

In the example implementation illustrated in FIG. 1, the geographic application 46 is stored in the memory 48 as a set of instructions executed by the one or more processors 40. As discussed below, an LOD interpolating vertex shader 62 and a fragment shader 64 operate on the graphics card 50 in conjunction with, or as a part of, the geographic application 46. Generally speaking, the geographic application 46 can generate interactive digital maps and, depending on the implementation and/or scenario, obtain navigation directions, provide data related to geolocated businesses, retrieve and display geographic commercial data such as coupons and offers, etc. Depending on the implementation, the geographic application 46 can operate as a standalone application or as a component of another application such as a web browser, for example.

In operation, the geographic application 46 receives map data from the map data server 12 as a set of vector-based map tiles, for example. Using the map data, the geographic application 46 can format and pass vertex coordinates and vertex attributes to the vertex shader 62, encoding style identifiers in vertex attributes, so that the vertex shader 62 can retrieve style parameters from a style table. In an example implementation, the style table is stored in uniform array 70 (referred to herein as simply "uniforms" 70) in the buffer(s) 66. As is known, uniform arrays persistently store information in the memory of a graphics card through multiple executions of vertex and fragment shaders. The graphics card 50 can execute the LOD interpolating vertex shader 62 and the fragment shader 64 to render map features according to the LODs and style parameters specified by the instructions of the geographic application 46 executing on the one or more processors 40.

In some implementations, the uniforms 70 may store an indexed set of style parameters for all map tiles utilized by the geographic application 46. For example, the uniforms 70 may store color, width, or other style parameters for every map tile at every zoom level of a two-dimensional organization of geospatial data (e.g., of the globe). Storing style parameters in the uniforms 70 allows rendering without a need for frequent updates of the style parameters in the uniforms 70. However, in some other implementations, the uniforms 70 may store only some of the style parameters utilized by the geographic application 46 and may be updated over time to include more or different style parameters.

More generally, the uniforms 70 can include any number of values, attributes, numbers, symbols, etc. utilized by a graphics pipeline to render graphics, such as digital map tiles. The data and parameters in the uniforms 70 are shared among all vertex shaders and fragment shaders of a graphics pipeline that includes the shaders 62 and 64. In an implementation utilizing the OpenGL Shading Language (GLSL), the uniforms 70 may be declared with a "uniform storage qualifier" and may be passed as parameters to any shader program. As indicated above, the uniforms 70 remain unchanged (i.e., they "persist") from the execution of one shader program to the execution of another shader program within a particular rendering process. In some implementations, the uniforms 70 may include constant values, such as positions, styles, etc., across one or more vertices, but, in general, the uniforms 70 may include any parameters constant or non-constant across one or more vertices and possible as parameters to all shaders of a graphics pipeline.

In another implementation, style parameters can be encoded using texture coordinates. More particularly, a texture can be a two-dimensional array that normally stores pixels as elements to define a bitmap, and some "pixel" values in certain predefined positions can store style parameters. In yet another implementation, style parameters can be encoded as vertex attributes. In this case, however, style parameters are assigned to individual vertices.

In some cases, programs or modules, such as application programming interfaces (APIs) of the graphics card 50, may constrain the amount of storage for the uniforms 70. In some implementations, the uniforms 70 are stored in the buffers 66 on the graphics card 50, but geographic application 40 also can be configured to also store the uniforms 70 in larger off-chip buffers to increase the amount of storage for the uniforms 70.

The geographic application 46 can include an LOD selector 80 that implements LOD selection techniques such as determining corner LODs for map tiles, passing style information to vertex shaders via uniform arrays, etc. Example operation of the LOD selector 80 is discussed in more detail below with reference to FIGS. 2-5.

Selecting LOD Levels for Variable LOD Rendering

Figure 2:
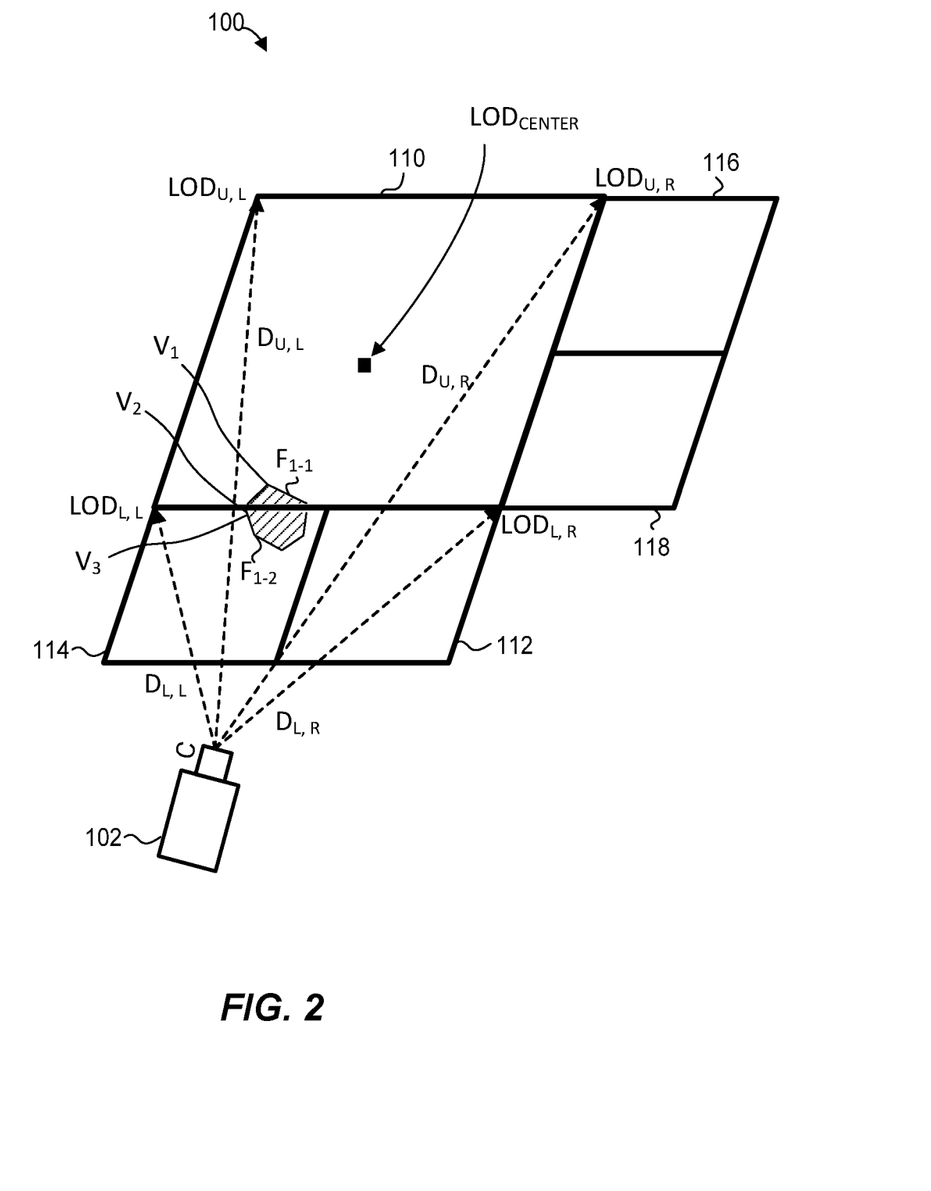
FIG. 2 is a diagram that schematically illustrates LOD calculation based on distances from a virtual camera to corners of map tiles that make up a view of a digital map.

FIG. 2 schematically illustrates LOD calculation based on distances from a virtual camera 102 to corners of map tiles 110-118, which partially make up a view of a digital map 100. The virtual camera 102 has a certain position and orientation in 3D space relative to the map plane on which map tiles 110-120 are disposed. The position and orientation of the virtual camera 102 effectively defines the viewport that delimits the current view of the digital map 100. Referring back to FIG. 1, the digital map 100 can be generated by the geographic application 46, and the plane on which the viewport is disposed can be the plane of the touchscreen 44, for example.

In some implementations, the digital map 100 is a Mercator-projection map. In these cases, distances to various points on the digital map 100 are measured relative to the plane of the virtual camera 102 rather the virtual camera 102 as represented by a point in a 3D space. In other implementations, the digital map 100 is a spherical map, in which case distances to various points on the digital map 100 are measured relative to the virtual camera 102. For example, the geographic application 46 can display 2D maps as Mercator-projection maps and 3D maps as spherical maps. Thus, while FIG. 2 illustrates (for convenience) camera distances as vectors between the digital map 100 and the virtual camera 102, it will be understood that the distance in other implementations can be measured relative to the plane of the virtual camera 102. For the same reason, the term "distance" as applied to a virtual camera in this document can refer either to the distance from the virtual camera itself or the plane of the virtual camera, unless stated otherwise.

In the scenario of FIG. 2, the map plane is tilted, and so the map plane is not parallel to the plane of the viewport. Map features in the lower portion of the view of the digital map 100 appear to be closer to the user than map features in the upper portion of the view. Accordingly, the distance from the virtual camera 102 to the upper left corner of map tile 110, along the line-of-sight vector, is $D_{U,L}$, the distance to the upper right corner is $D_{U,R}$, the distance to the lower left corner is $D_{L,L}$, and the distance to the lower right corner is $D_{L,R}$. The LOD selector 80 (see FIG. 1) or another suitable module can determine the distances $D_{U,L}$, $D_{U,R}$, $D_{L,L}$ and $D_{L,R}$ and determine, based on these distances, corresponding corner LOD values $LOD_{U,L}$, $LOD_{U,R}$, $LOD_{L,L}$ and $LOD_{L,R}$. When rendering the digital map 100, the vertex shader 62 can use these four corner LOD values to determine the LOD value for any vertex in the map tile 110. To this end, the vertex shader 62 can apply bilinear interpolation of the four corner LOD values in accordance with the distance between a given vertex and the corners of the map tile 100.

The LOD selector 80 can determine corner LODs for the map tiles 112-118 in a similar manner. Because in this example the upper left corner of the map tile 114 coincides with the lower left corner of the map tile 110, the LOD selector 80 generates the same, or substantially same, corner LOD values for these two corners. Similarly, because the upper right corner of the map tile 112 coincides with the lower right corner of the map tile 110, the LOD selector 80 generates the same LOD values for these two corners.

As a result of interpolating LOD values for individual vertices, the vertex shader can obtain different LOD values for vertices $V_1$ and $V_2$ of map feature $F_{1-1}$, so that the styling varies between vertices $V_1$ and $V_2$. Moreover, when the adjacent map tile 112 includes map feature $F_{1-2}$ that forms a continuous image with the map feature $F_{1-1}$ when rendered, the vertex shader generates very similar or possibly even identical LOD values for vertices $V_2$ and $V_3$ of map features $F_{1-1}$ and $F_{1-2}$, respectively, as these vertices are closely spaced. LOD-dependent styling of map features is discussed in more detail below with reference to FIG. 3.

As also illustrated in FIG. 2, the digital map 100 can include map tiles corresponding to different zoom levels. In this example, map tile 110 corresponds to a lower level of magnification, and accordingly includes coarser data, than the map tiles 112-118. In a quadtree tiling scheme discussed above, the map tile 110 can be at a level than is one lower than the level of the map tiles 112-118. To make the view of the digital map 100 continuous, the geographic application 46 scales the data in the map tile 110 when rendering to make the map tiles 110-118 compatible. For example, the vertices and connecting lines that make up map feature $F_{1-1}$ can be scaled by a factor of two, horizontally and vertically, to "stretch" the representation of map feature $F_{1-1}$.

Generally speaking, zoom levels of map tiles can correspond to certain LOD levels. These LODs are the same for all map features when the virtual camera 102 is facing the map plane directly from above, i.e., when the line-of-sight vector of the virtual camera 102 is perpendicular to the map plane. The LOD selector 80 can determine the corner LOD values $LOD_{U,L}$, $LOD_{U,R}$, $LOD_{L,L}$ and $LOD_{L,R}$ for the map tile 110 using the LOD value that normally corresponds to the map tile 110. As a more specific example, the map data server 12 can provide the map tile 110 to the client device 14 and indicate the zoom level of the map tile 110, from which the LOD for the map tile 110 can be derived, or directly indicate the LOD for the map tile 110. The LOD selector 80 can associate this LOD value with the geometric center of the map tile 110 when the map plane is tilted, and compute the $LOD_{U,L}$, $LOD_{U,R}$, $LOD_{L,L}$ and $LOD_{L,R}$ using this $LOD_{CENTER}$ value and the distances $D_{U,L}$, $D_{U,R}$, $D_{L,L}$ and $D_{L,R}$ as discussed above.

More generally, the LOD selector 80 can determine vector-specific LODs based on any suitable organization of map data, and not necessarily using corner LODs of the map tiles illustrated in FIG. 2. In other words, a vertex shader can interpolate LOD for a vertex $V_i$ using known LODs at several vertices $V_1, V_2, \ldots V_N$ with known coordinates.

If the geographic application 46 were to render the entire digital map 100 at the same single LOD, and if this value were selected to make the representation of all map features relatively complex, the view could include visual clutter in the upper portion due to the tilt. In particular, because a larger geographic area is visible in the upper portion of the view, more map features become visible and thus require rendering. In addition to visual clutter, using the same detailed LOD value makes rendering the "busy" portions of the view computationally expensive. On the other hand, if an LOD value for the entire digital map 100 were selected to make the representation of all map features relatively simple, the lower portion of the view would appear too coarse. Thus, using a single LOD value to render a tilted view of a digital map does not always yield the best performance or visual quality.

As one alternative to using a single LOD for the entire view of a tilted digital map, the geographic application 46 could use tile-specific LOD values. For example, in the configuration of FIG. 2, the map tile 110 could have $LOD_{CENTER}=3$ and the map tiles 112 and 114 could have $LOD_{CENTER}=4$. In this case, however, the boundaries between the map tiles 110 and 112, 114 are rendered with visual discontinues, and the view of the digital map 100 can include noticeable seams between at least some of the map tiles. Moreover, visual discontinuities in some cases may be visible even if the geographic application 46 were to render map features with feature-specific LODs rather than vertex-specific LODs.

In contrast to these approaches, LOD and styling interpolation techniques of this disclosure allow the geographic application 46 to generate a seamless view of the digital map 100, with visual attributes gradually changing as the distance between the virtual camera 102 and map features changes. Moreover, the geographic application 46 can render map features with vertex-specific LOD values quickly and efficiently, as discussed below with reference to FIG. 3.

Passing Parameters to a Rendering Engine

Figure 3:
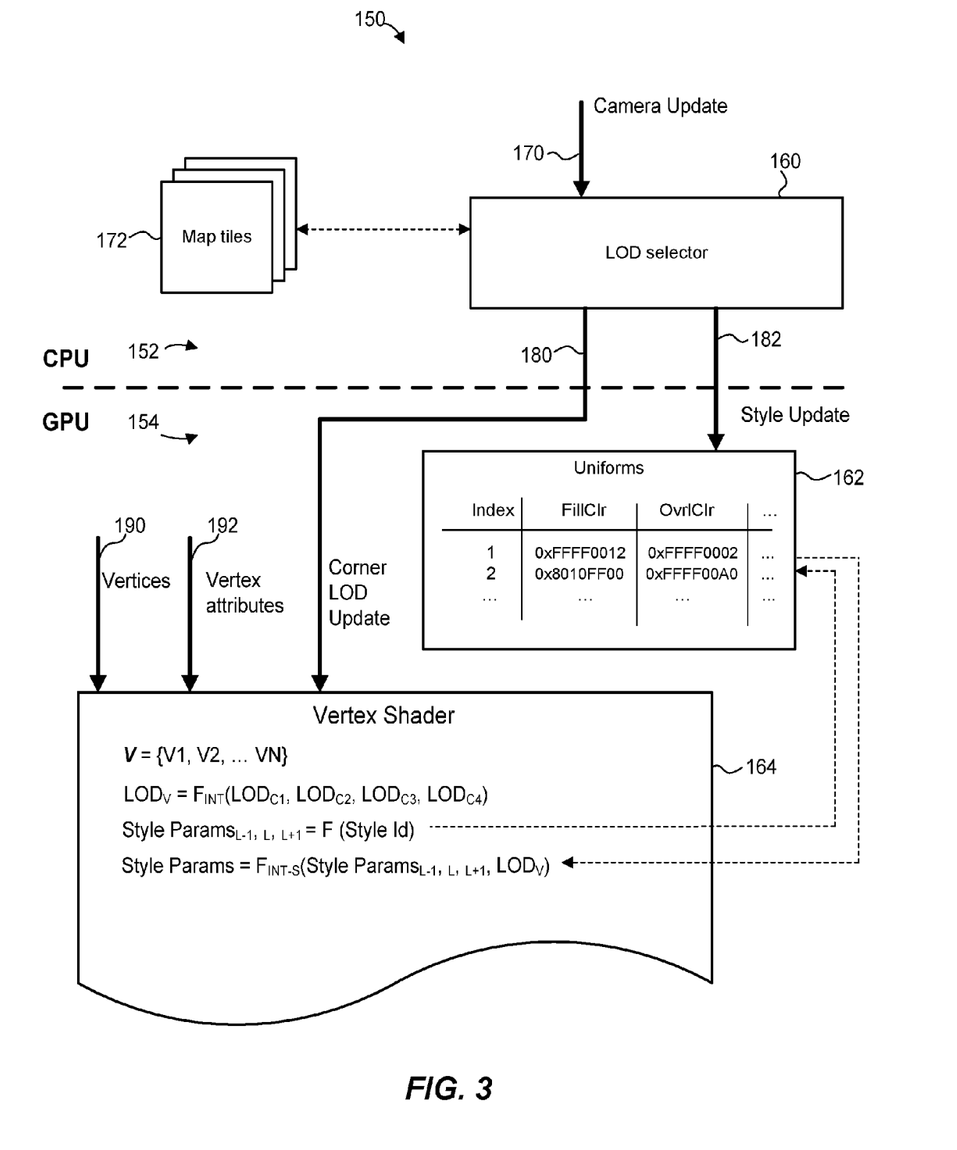
FIG. 3 is a block diagram that illustrates LOD interpolation and LOD-dependent styling on a graphics card, which can be implemented in the system of FIG. 1.

Now referring to FIG. 3, a block diagram 150 illustrates LOD interpolation and LOD-dependent styling on a graphics card which can be implemented in the client device 14 of FIG. 1, for example, or a similar device. As a more specific example, a CPU domain 152 of FIG. 2 can correspond to operations carried out on the one or more processor(s) 40, and a GPU domain 154 of FIG. 2 can correspond to operations carried out on the graphic card 50. Accordingly, the LOD selector 80, the uniform array 70, and the vertex shader 62 of FIG. 1 can be implemented as an LOD selector 160, a uniform array 162, and a vertex shader 164, respectively.

The LOD selector 160 is configured to receive a camera update 170 which indicates a new position and/or orientation of a virtual camera (such as the virtual camera 102 of FIG. 2). The camera update 170 can correspond to the user repositioning the virtual camera via appropriate gestures, interactive controls, voice commands, etc. recognized by the geographic application 46 or to the geographic application 46 automatically repositioning the virtual camera during navigation, for example. The LOD selector 160 can determine whether the new position and orientation of the virtual camera requires updates to the set of map tiles 170 used to generate the current view of the digital map. The map tiles 172 can be stored in a persistent memory of the device (e.g., the memory 48).

The LOD selector 160 in this example implementation generates corner LOD updates 180 and provides these to the vertex shader 164 as uniform variables, for example. The LOD selector 160 also generates style updates 182 by updating the uniform array 162, which can store style information, such as fill color, overlay color and width, for multiple styles. The uniform array 162 can be indexed by style identifiers, or "style ids." The vertex shader 164 receives vertex data 190 and vertex attributes 192 from the CPU domain 152 (e.g., from the LOD selector 160 or from another component of the geographic application). The vertex attributes 192 specify style ids for vertices supplied as part of the vertex data 190, according to one implementation. Using the LOD updates 180, the vetex shader 164 calculates interpolated LODs for individual vertices and looks up the corresponding style information in the uniform table 162.

More specifically, the LOD selector 160 can determine that the map tiles 172 make up a view of the digital map in accordance with the position and orientation of the virtual camera. If the map tiles 172 now include one or more map tiles that were not a part of the view in accordance with the previous position and orientation of the virtual camera, the LOD selector 160 can provide new vertex data 190 to the vertex shader 164. In some scenarios, the LOD selector 160 updates only some of the vertex data 190 without re-supplying vertex data for those map tiles that continue to make up a part of the view. However, because the vertex shader 164 may need to render map features described by these already-available vertices differently because of the change in the position or orientation of the virtual camera, the LOD selector 160 in some cases supplies new corner LOD values to the vertex shadier 164 and updates the uniform table 162. Thus, if the $LOD_{CENTER}$ for a map tile previously provided to the vertex shader 164 has changed, the LOD selector 160 calculates the new corner LOD values and updates the style information as necessary in the uniform array 162. Thus, the vertex shader 164 can efficiently re-use previously received vertices defining map tile geometry using the same style identifiers to retrieve updated style information in the uniform array 162.

For clarity, FIG. 3 further illustrates an example sequence of operations the vertex shader 164 performs when invoked to render a scene (i.e., an updated view of the digital map). The vertex shader 164 receives a set of vertices V that define the geometry of map features. The vertex shader 164 then calculates the LOD for each vertex using, for example, a bilinear interpolation function $F_{INT}$ based on the corner LOD values and the position of the vertex relative to the corners of the map tile.

The vertex shader 164 then can retrieve style parameters from the uniform array 162. To subsequently interpolate these parameters, the vertex shader 164 in some implementations retrieves style parameters corresponding to the adjacent discrete zoom levels. For example, for a style corresponding to a local road rendered at zoom level 5, the vertex shader 164 also can retrieve style parameters for the styles at which a local road is rendered at zoom levels 4 and 6. The vertex shader 164 then can interpolate style parameters for the vertex using the style parameters for zoom levels L-1, L, and L, in accordance with the vertex-specific LOD.

Example Methods that can be Implemented in the System of FIG. 1

Figure 4:
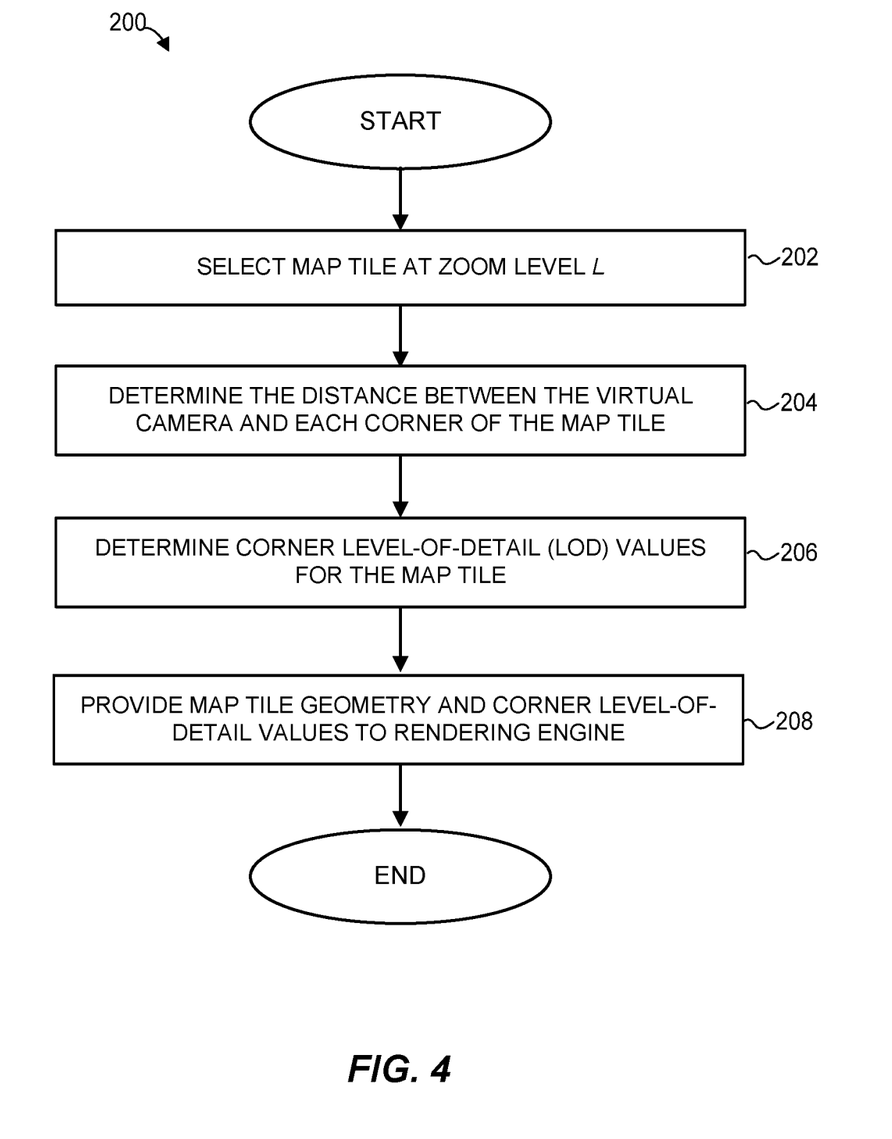
FIG. 4 is a flow diagram of an example method for efficiently providing LOD information for rendering a map tile, which can be implemented in the system of FIG. 1.

Now referring to FIG. 4, an example method 200 for efficiently providing LOD information for rendering a map tile can be implemented in the LOD selector 80 or 160, for example. More generally, the method 200 can be implemented in any suitable software component that operates in conjunction with programs executing on a graphics card (e.g., shaders). The method 200 can be executed as part of rendering a scene upon a change in the position and/or orientation of a virtual camera.

The method 200 begins at block 202, where a certain map tile at zoom level L is selected for use in generating a view of a digital map. At block 204, the distance between a virtual camera and each of the four corners of the map tile is determined. In a top-down view, the distance to the four corners can be assumed to be the same. However, when the map plane is tilted, the distances from the virtual camera to at least two of the corners are different from each other.

Next, at block 206, corner LOD are determined in accordance with the distances calculated at block 204. To this end, the "default" LOD of the map tile can be used. For example, the LOD of the map tile can be used as the LOD of the geometric center of the map tile, and the corner LODs can be calculated relative to the LOD of the geometric center.

At block 208, map tile geometry and corner LODs are provided to a rendering engine such as the graphics card. Map tile geometry can include a set of vertices. As discussed above, other parameters can be passed as uniforms and/or vertex attributes, for example. The method completes after block 208.

Figure 5:
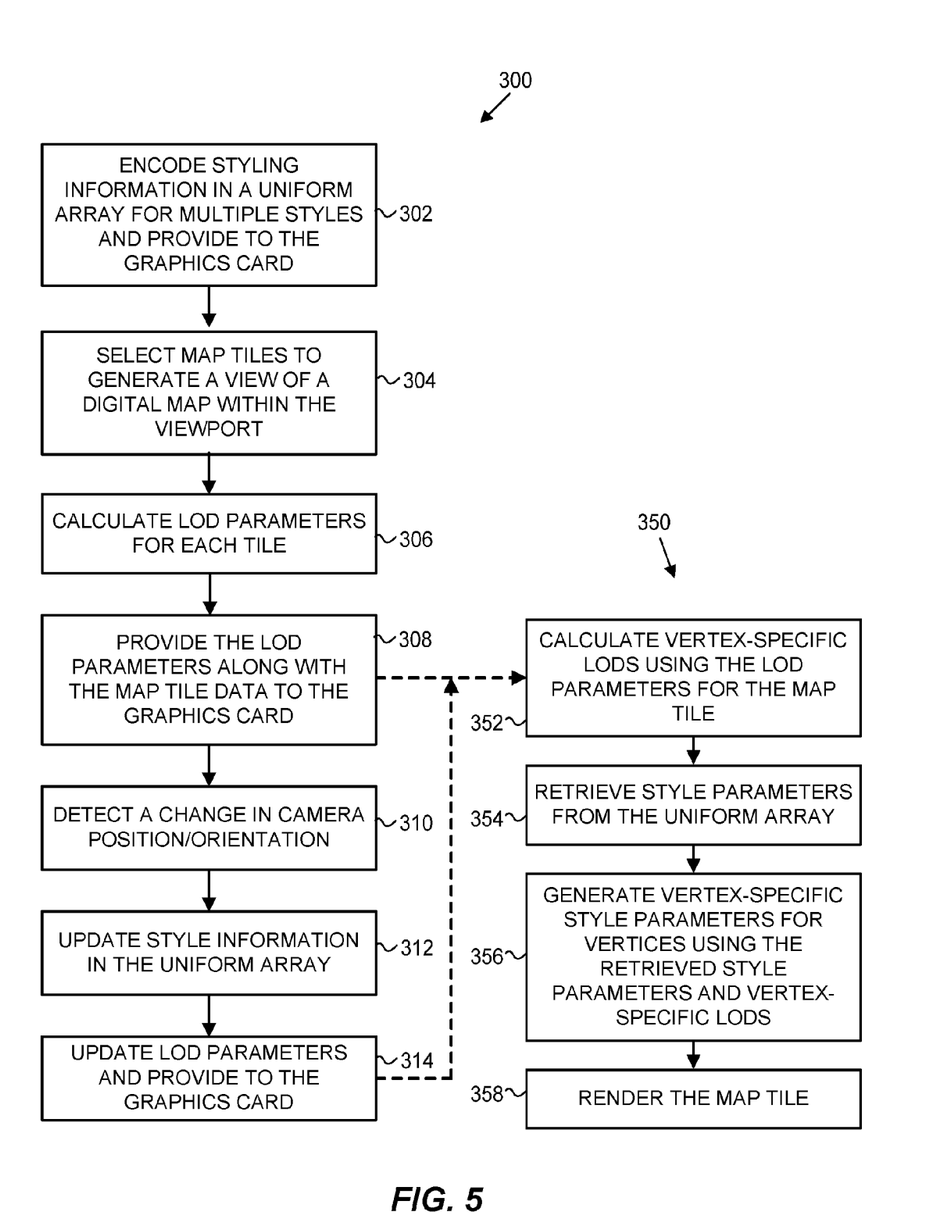
FIG. 5 is a flow diagram of an example method for rendering map features at multiple LODs, which can be implemented in the system of FIG. 1.

FIG. 5 illustrates is a flow diagram of an example method 300 for rendering map features at multiple LODs, which can be implemented in the geographic application 46, for example. Referring back to FIG. 3, for example, the method 300 can be implemented partially in the CPU domain 152 and partially in the GPU domain 154.

At block 302, style information is encoded in a uniform array for multiple styles, indexed by style identifiers. The uniform array is allocated in a memory of the graphics card and is directly accessible by shaders. In one implementation, the complete set of styles used by the geographic application is encoded, regardless of whether each of these styles is referenced at least once in a map tile to be rendered. In another implementation, only those styles that are used by the map tiles are encoded in a uniform array.

At block 304, map tiles that make up the current view of the digital map are selected based on the position and orientation of the virtual camera, for example. Next, at block 306, corner LOD parameters are calculated for each map tile as discussed above with reference to FIG. 4. These corner LODs are provided along with the map tile data to the graphics card at block 308. For example, the map tile data can include map feature encoded as vertex coordinates and style identifiers encoded as vertex attributes.

When a change in camera position and/or orientation is detected at block 310, style information in the uniform array can be updated at block 312, and new corner LODs can be calculated at block 314. For example, fill color, overlay color, etc. for style 27 can be updated with new values directly in the uniform array. In this manner, shaders can continue to refer to style 27 to re-render map features to make these map features appear closer or father away, with the colors and line thickness appropriately adjusted. The blocks 310-314 can be executed for every update in the camera position.

With continued reference to FIG. 5, a rendering engine implemented on a graphics card, for example, can execute a sequence 350 in parallel with some of the blocks 308-314. At block 352, vertex-specific LODs can be determined using corner LOD values. Each vertex-specific LOD can be a result of bilinear interpolation of the corner LOD values in accordance with the distances of the vertex from the corners of the tile.

At block 354, style parameters are retrieved from the uniform array. As indicated above, a style can correspond to a certain type of map features, such as local road, rendered at a certain zoom level, and style parameters corresponding to the same type are retrieved at block 354 for the lower and higher zoom levels.

Next, at block 356, vertex-specific style parameters are generated using the style parameters retrieved at block 354 and vertex-specific LODs calculated at block 352. To this end, linear interpolation can be used. For example, fill color can be interpolated between blue and dark blue corresponding to two adjacent zoom levels, respectively, to generate an intermediate shade of blue. At block 357, the map tile is rendered in accordance with the determined styling.

Additional Considerations

Generally speaking, the techniques of this disclosure can be implemented portable devices, non-portable devices, standalone navigation systems, navigation systems built into head units of vehicles, wearable devices, etc. Further, these techniques in general are applicable to both outdoor and indoor maps. Still further, although the examples above referred primarily to the geographic application 46, these techniques similarly can be implemented in an application programming interface (API) which other software applications, such as web browsers, can invoke.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict some embodiments of the system 100 for alignment of visual indicators on navigational maps and mapping system 700 in a mapping system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the system 100 for alignment of visual indicators on navigational maps. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of rendering features of digital maps, the method comprising:
 selecting, using one or more processors, a map tile corresponding to a certain geographic area and a certain zoom level, the map tile containing indications of geometries for a plurality of map features;
 determining, using the one or more processors, a distance between a virtual camera and each corner of the map tile, wherein at least two of the resulting distances are different;
 determining, for each of the corners using the one or more processors, a corner level-of-detail (LOD) based on the corresponding distance from the virtual camera; and
 providing (i) the indications of geometries for the plurality of map features and (ii) the determined corner LODs to a rendering engine for rendering each of the plurality of map features using LODs interpolated between the corner LODs, as part of generating a view of a digital map.

2. The method of claim 1, further comprising:
 providing, to the rendering engine, style information specifying at least one of color or width for each of a plurality of LODs, wherein the rendering engine renders the plurality of map features in accordance with the style information.

3. The method of claim 2, further comprising selecting, using the one or more processors, the style information based on the determined corner LODs.

4. The method of claim 2, wherein providing the style information to the rendering engine includes:
 encoding the style information in a uniform array, and
 assigning vertex attributes to vertices that make up the plurality of map features, including selecting the vertex attributes based on the determined corner LODs, wherein the uniform array is indexed by the vertex attributes.

5. The method of claim 2, further comprising:
 determining, using the one or more processors, a change in the corner LODs of the map tile in response to a change in a position of the virtual camera relative to the corners of the map tile; and
 providing, to the rendering engine, updated style information for applying to the indications of geometries for the plurality of map features previously provided to the rendering engine.

6. The method of claim 1, wherein the indications of geometries specify sets of vertices for each of the plurality of map features, the method further comprising:
 applying, at the rendering engine, bi-linear interpolation to the corner LODs to determine respective LOD values for the vertices.

7. The method of claim 1, the method further comprising:
 determining, using the one or more processors, a plurality of map tiles for rendering the view of the digital map, wherein at least two of the plurality of map tiles correspond to different zoom levels;
 for each of the plurality of map tiles, using the one or more processors to:
  determine the distance between the virtual camera and each corner of the map tile, wherein at least two of the resulting distances are different,
  determine, for each of the corners, a corner level-of-detail (LOD) based on the corresponding distance from the virtual camera, and
  provide the indications of geometries for the plurality of map features and the determined corner LODs to the rendering engine.

8. The method of claim 1, wherein determining the distance between the virtual camera and each corner of the map tile includes measuring the distance relative to a plane of the virtual camera.

9. The method of claim 1, wherein determining the distance between the virtual camera and each corner of the map tile includes measuring the distance relative to a point representing the virtual camera in a three-dimensional (3D) space.

10. A method of rendering features of digital maps, the method comprising:
  determining, using one or more processors, a position and orientation of a virtual camera relative to a plane of a digital map, wherein the plane is tilted so that a plane of a viewport of the digital map is not parallel to the plane of the digital map, the viewport delimiting a view of the digital map;
  selecting, using the one or more processors, a plurality of map features to be included in the view in accordance with the determined position and orientation of the virtual camera;
  determining, using the one or more processors, a level-of-detail (LOD) for each of the plurality of map features in accordance with a distance between the virtual camera and the map feature; and
  rendering, using a rendering engine, the plurality of map features in accordance with the determined LODs;
  wherein selecting the plurality of map features includes selecting a set of two or more map tiles to which the plurality of map features belong, each map tile corresponding to a certain geographic area and a certain zoom level, including selecting at least two map tiles corresponding to different zoom levels;
  wherein determining the LOD for each of the plurality of map features includes determining, for each map tile in the set of map tiles, a corner LOD for each of the corners of the map tile based on a distance between the virtual camera and each of the corners, wherein at least two of the resulting LODs are different; and
  wherein rendering the plurality of map features includes bi-linearly interpolating the corner LODs to determine the LODs for the plurality of map features.

11. The method of claim 10, wherein rendering the plurality of map features includes:
  providing, to the rendering engine using the one or more processors, (i) coordinates of vertices that make up the plurality of map features, (ii) style information specifying at least one of color or width for each of a plurality of LODs, and (iii) vertex attributes corresponding to the vertices, the vertex attributes indicative of styling to be applied to plurality of map features;
  wherein rendering the plurality of map features includes applying, using the rendering engine, the style information in accordance with the determined LODs and the vertex attributes.

12. The method of claim 11, wherein providing the style information to the rendering engine includes:
  encoding the style information in a uniform array, and
  wherein the uniform array is indexed by the vertex attributes.

13. The method of claim 11, further including:
  determining, using the one or more processors, a change in the LODs of the map features in response to a change in the position or orientation of the virtual camera relative to the plane of the digital map; and
  providing, using the one or more processors to the rendering engine, updated style information for applying to the plurality of map features previously provided to the rendering engine.

14. A computing device comprising:
  one or more general-purpose processors;
  a rendering engine including one or more graphics processors;
  a display device;
  a non-transitory memory readable by the one or more general-purpose processors and storing thereon instructions that, when executed, cause the computing device to:
    select a map tile corresponding to a certain geographic area and a certain zoom level, the map tile containing indications of geometries for a plurality of map features,
    determine a distance between a virtual camera and each corner of the map tile, wherein at least two of the resulting distances are different,
    determine, for each of the corners, a corner level-of-detail (LOD) based on the corresponding distance from the virtual camera, and
    provide (i) the indications of geometries for the plurality of map features and (ii) the determined corner LODs to the one or more graphics processors,
  wherein the one or more graphics processors render each of the plurality of map features using LODs interpolated between the corner LODs to generate a view of a digital map for display via the display device.

15. The computing device of claim 14, wherein the instructions further cause the computing device to:
  provide, to the rendering engine, style information specifying at least one of color or width for each of a plurality of LODs, wherein the rendering engine renders the plurality of map features in accordance with the style information.

16. The computing device of claim 15, wherein the instructions further cause the computing device to select the style information based on the determined corner LODs.

17. The computing device of claim 15, wherein to provide the style information to the rendering engine, the instructions further cause the computing device to:
  encode the style information in a uniform array, and
  encode vertex attributes to vertices that make up the plurality of map features,
  wherein the uniform array is indexed by the vertex attributes.

18. The computing device of claim 15, wherein the instructions further cause the computing device to:
  determine a change in the corner LODs of the map tile in response to a change in a position of the virtual camera relative to the corners of the map tile; and
  provide updated style information for applying to the indications of geometries for the plurality of map features previously provided to the rendering engine.

19. The computing device of claim 14, wherein the indications of geometries specify sets of vertices for each of the plurality of map features, the instructions further causing the computing device to:
  apply, at the rendering engine, bi-linear interpolation to the corner LODs to determine respective LOD values for the vertices.

20. The computing device of claim 14, wherein the instructions further cause the computing device to:
  determine a plurality of map tiles for rendering the view of the digital map, wherein at least two of the plurality of map tiles correspond to different zoom levels;
  for each of the plurality of map tiles:
    determine the distance between the virtual camera and each corner of the map tile, wherein at least two of the resulting distances are different,
    determine, for each of the corners, a corner level-of-detail (LOD) based on the corresponding distance from the virtual camera, and provide the indications of geometries for the plurality of map features and the determined corner LODs to the rendering engine.

* * * * *